(12) United States Patent
Hosaka et al.

(10) Patent No.: US 8,459,013 B2
(45) Date of Patent: Jun. 11, 2013

(54) UREA TANK WITH CLOSURE MEMBER FOR VEHICLE EXHAUST SYSTEM

(75) Inventors: Yoshihiro Hosaka, Portland, OR (US); Gregor Reimann, Portland, OR (US)

(73) Assignee: Daimler Trucks North America LLC, Portland, OR (US)

( * ) Notice: Subject to any disclaimer, the term of this patent is extended or adjusted under 35 U.S.C. 154(b) by 500 days.

(21) Appl. No.: 12/628,991

(22) Filed: Dec. 1, 2009

(65) Prior Publication Data
US 2010/0162690 A1 Jul. 1, 2010

Related U.S. Application Data

(60) Provisional application No. 61/204,019, filed on Dec. 30, 2008.

(51) Int. Cl.
*F01N 3/00* (2006.01)

(52) U.S. Cl.
USPC .......... 60/295; 60/285; 60/286; 220/562; 220/564

(58) Field of Classification Search
USPC ............. 60/286, 295, 301; 220/296, 297, 220/298, 300, 562, 367.1, 203.01–203.02, 220/203.04, 203.19, 360, 86.1, DIG. 32, 220/DIG. 33, 200, 592.01
See application file for complete search history.

(56) References Cited

U.S. PATENT DOCUMENTS

| | | | | |
|---|---|---|---|---|
| 4,562,732 A * | 1/1986 | Kitagawa et al. | ............... | 73/291 |
| 5,142,874 A * | 9/1992 | Maric | ............. | 62/49.2 |
| 6,063,350 A * | 5/2000 | Tarabulski et al. | ......... | 423/239.1 |
| 6,145,530 A * | 11/2000 | Fernandez | ................ | 137/74 |
| 6,266,955 B1 * | 7/2001 | Liang et al. | ................ | 60/274 |
| 6,363,771 B1 | 4/2002 | Liang et al. | | |
| 6,892,537 B1 * | 5/2005 | Hurwic | ............ | 60/585 |
| 6,935,103 B2 | 8/2005 | Binder et al. | | |
| 7,544,328 B2 * | 6/2009 | Osaku et al. | ............... | 422/527 |
| 7,943,101 B2 * | 5/2011 | Osaku et al. | ............... | 422/547 |
| 8,122,710 B2 * | 2/2012 | Schmale et al. | ............ | 60/286 |
| 2003/0094458 A1 * | 5/2003 | Beyer et al. | .............. | 220/562 |
| 2003/0188528 A1 * | 10/2003 | Tost | ................ | 60/286 |
| 2004/0171765 A1 * | 9/2004 | Tsuji et al. | ............. | 525/452 |

(Continued)

FOREIGN PATENT DOCUMENTS

WO WO 2007126366 A1 * 11/2007

*Primary Examiner* — Thomas Denion
*Assistant Examiner* — Patrick Maines
(74) *Attorney, Agent, or Firm* — Klarquist Sparkman, LLP

(57) ABSTRACT

A closure member for a urea tank used to provide urea to an exhaust treatment system of a vehicle comprises a closure member body defining respective urea inlet and outlet passages and coolant inlet and outlet passages therethrough. A valve carried by the closure member body, and a portion of the valve can be an integral one piece part of the closure member body, selectively blocks the flow coolant through the interior of the urea tank. When coolant flows into the tank, it is separated from urea in the tank by a recirculating conduit which returns the coolant from the coolant inlet passage to the coolant outlet passage. Coolant circulating within the tank heats urea therein. The coolant flow valve can comprise a solenoid controlled valve with an electrical connector carried by the coolant tank for making connections to wiring that provides power to the solenoid to control the valve. The closure member can also carry a support, such as a downtube, that can contain temperature and level sensing components with the closure member supporting a connector coupled to wiring for such components.

19 Claims, 8 Drawing Sheets

U.S. PATENT DOCUMENTS

| | | |
|---|---|---|
| 2005/0069468 A1 | 3/2005 | Huber et al. |
| 2007/0059222 A1* | 3/2007 | Satou et al. .................. 422/177 |
| 2007/0079599 A1* | 4/2007 | Osaku et al. .................. 60/283 |
| 2007/0157602 A1* | 7/2007 | Gschwind ...................... 60/274 |
| 2008/0011777 A1 | 1/2008 | Cooke |
| 2008/0022670 A1 | 1/2008 | Ichikawa |
| 2008/0089384 A1* | 4/2008 | Nishina et al. ................. 374/54 |
| 2009/0127265 A1* | 5/2009 | Magnusson et al. .......... 220/564 |
| 2009/0139214 A1* | 6/2009 | Reed ............................... 60/286 |
| 2009/0188923 A1* | 7/2009 | Versaw et al. ................. 220/564 |

* cited by examiner

UREA TANK WITH CLOSURE MEMBER FOR VEHICLE EXHAUST SYSTEM

CROSS REFERENCE TO RELATED APPLICATION

This application claims the benefit of U.S. provisional patent application No. 61/204,019, filed Dec. 30, 2008, entitled, "UREA TANK WITH CLOSURE MEMBER FOR VEHICLE EXHAUST SYSTEM", which is hereby incorporated by reference.

TECHNICAL FIELD

The disclosure relates to a urea tank system comprising a urea tank and tank closure member and to a closure member for a urea storage tank, the urea tank system being used for delivery of urea from a urea tank to an exhaust system of a vehicle and for returning urea from the exhaust system to the tank.

BACKGROUND

To reduce pollutants and emissions from vehicles, such as diesel engine powered truck tractors, environmental requirements have been placed on exhaust systems for such vehicles. In some systems of this type, urea from a urea storage tank is delivered to an exhaust system where it is applied as a urea dose to the exhaust to react with and reduce certain pollutants contained therein. Excess urea is returned to the storage tank for subsequent use in exhaust treatment. Under extremely cold vehicle operating conditions, it is possible for urea to freeze within the urea storage tank, making the stored urea unavailable for use in treating the exhaust. This can result in inadequate functioning of the exhaust treatment system. A temperature sensor has been used to sense the temperature of urea in the storage tank. In addition, coolant from the vehicle exhaust system, which has been warmed by the engine, has been withdrawn from the coolant system, circulated within the urea storage tank to warm and thaw a portion of the urea in the urea storage tank, with the coolant being returned to the engine coolant system. A valve remote from the storage tank has been used to control, in response to temperature signals from the temperature sensor, whether liquid from the engine coolant system is allowed to circulate through the urea storage tank. Also, urea storage tanks have been provided with a float for use as part of a level sensing circuit to provide signals indicative of the level of urea in the storage tank.

A need nevertheless exists for an improved urea storage tank system and closure member therefore.

SUMMARY

In accordance with one embodiment, a closure member is provided for closing a tank opening communicating with the interior of a urea storage tank, the urea storage tank being for use in a urea delivery system for delivering urea to and receiving urea from an exhaust treatment system of a vehicle, the vehicle comprising an engine coolant system. In this embodiment, the closure member comprises a closure member body adapted for detachable mounting to the tank so as to cover the tank opening; the closure member body comprising a urea inlet communicating with the interior of the urea storage tank and for coupling to the exhaust treatment system of the vehicle for use in returning urea to the interior of the urea storage tank from the exhaust treatment system, a urea outlet communicating with the interior of the urea storage tank and for coupling to the vehicle exhaust treatment system for use in delivering urea from the interior of the urea storage tank to the exhaust treatment system, a coolant inlet for coupling to the vehicle coolant system and a coolant inlet passageway communicating from the coolant inlet through the closure member body, a coolant outlet for coupling to the vehicle coolant system and a coolant outlet passageway communicating from the coolant outlet through the closure member body; a heating conduit positioned within the interior urea storage chamber and communicating from the coolant inlet passageway to the coolant outlet passageway; and the closure member body also comprising a valve body and valve within the valve body that is operable to selectively open and close at least one of the coolant inlet passageway and the coolant outlet passageway so as to selectively permit the flow of coolant from the vehicle coolant system, through the coolant inlet, through the coolant passageway, through the heating conduit, through the coolant outlet passageway, through the coolant outlet and back to the vehicle coolant system.

As another aspect of an embodiment, the closure member can comprise a support carried by the closure member body and extending into the interior of the urea chamber, a urea temperature sensor carried by the support and a urea level sensor carried by the support.

In accordance with one aspect of an embodiment, the valve can comprise a solenoid controlled valve. A first electrical connector can be carried by the closure member body for coupling electrical conductors to the solenoid controlled valve to provide power thereto. A second electrical connector can also be provided for coupling electrical conductors to the temperature sensor and to the level sensor.

As another aspect of an embodiment, the closure member body can be molded of a polymer material. Also, as a further aspect of an embodiment, at least a portion of the valve body can be a one piece integral portion of the closure member.

In addition, the closure member can comprise ninety-degree bend rotatable conduit couplings, a respective one of such couplings being mounted to each of the coolant inlet, the coolant outlet, the urea inlet and the urea outlet.

In accordance with another embodiment, a urea tank assembly is disclosed for a urea delivery system for delivering urea to and receiving urea from an exhaust treatment system of a vehicle, the vehicle comprising an engine coolant system. In this embodiment, the urea tank assembly comprises, a urea tank body defining an interior urea storage chamber; the tank body comprising a tank opening at an upper portion of the tank body; a tank closure member detachably mounted to the tank body so as to cover the tank opening, the tank closure member comprising a closure member body, the closure member body comprising a urea inlet communicating with the urea storage chamber and for coupling to the exhaust treatment system of the vehicle for use in returning urea from the exhaust treatment system to the urea storage chamber, a urea outlet communicating with the urea storage chamber and for coupling to the vehicle exhaust treatment system for use in delivering urea from the urea storage chamber to the exhaust treatment system, a coolant inlet for coupling to the vehicle coolant system and a coolant inlet passageway communicating from the coolant inlet through the closure member body, a coolant outlet for coupling to the vehicle coolant system and a coolant outlet passageway communicating from the coolant outlet through the closure member body, a heating conduit positioned within the interior urea storage chamber and communicating from the coolant inlet passageway to the coolant outlet passageway, the closure member body also comprising a valve body and valve within the valve body that is operable to selectively open and close at least one of the coolant inlet passageway and the coolant outlet passageway so as to selectively permit the flow of coolant from the vehicle coolant system, through the coolant inlet, through the coolant passageway, through the heating conduit, through the coolant outlet passageway, through the coolant outlet and back to the vehicle coolant system.

The closure member of the urea tank assembly can have one of more of the other features of a closure member described above.

These and other features of improved closure members and tank assemblies will become more apparent from the description below.

DETAILED DESCRIPTION

Figure 1:
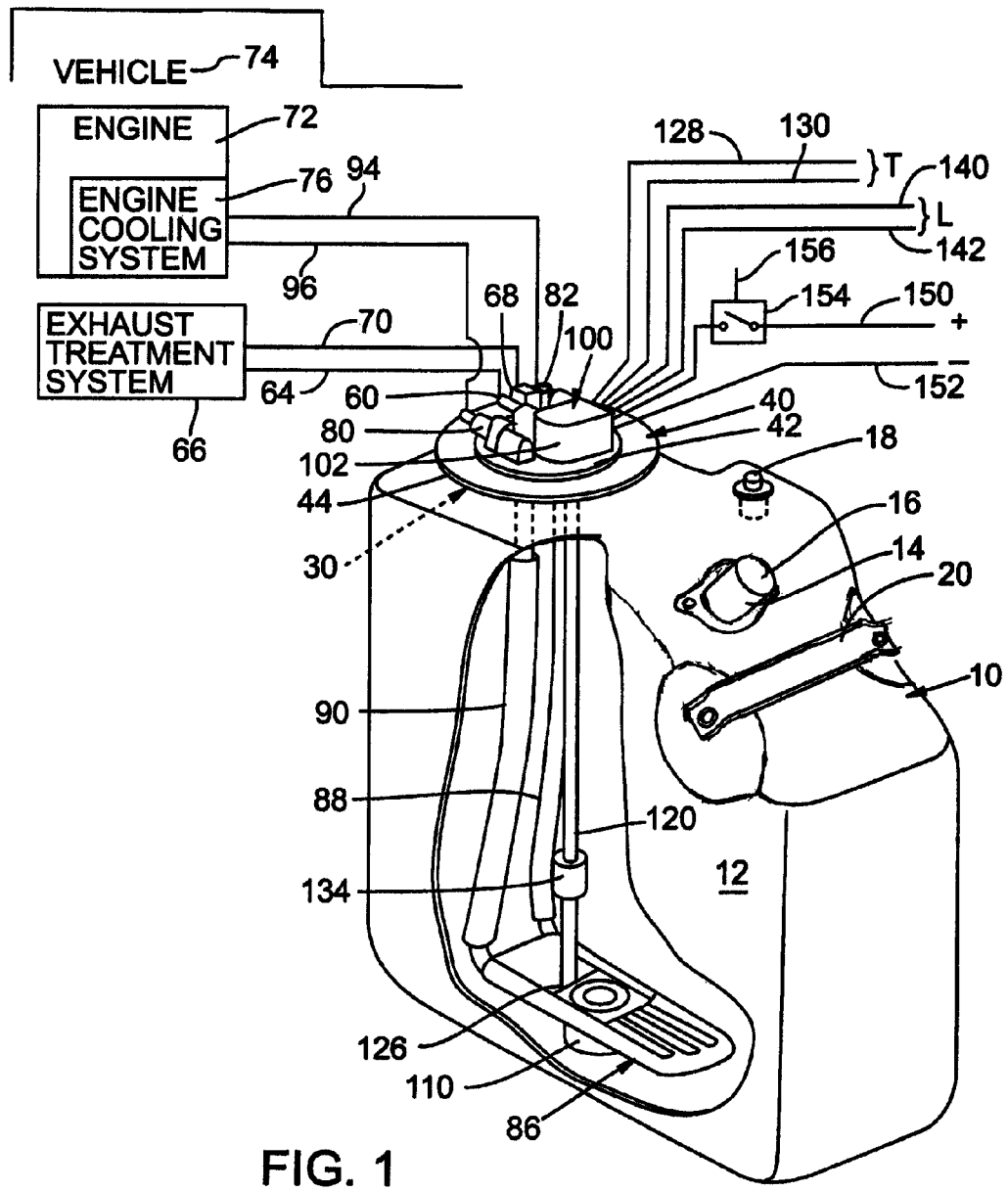
FIG. 1 is a perspective view of one embodiment of a tank assembly and closure member together with portions of an engine, engine coolant system, and exhaust treatment system of a vehicle shown in schematic form.

With reference to FIG. 1, a tank assembly for use in delivering urea to an exhaust system of a vehicle is illustrated. The assembly comprises a urea storage tank 10 that includes a hollow interior that defines an internal urea storage chamber 12. A fill spout 14 is mounted to an upper surface of tank 10. Fill spout 14 communicates with the interior 12 of the tank and is closed by a cap 16. In this embodiment, a tank vent 18 is also shown. Vent 18 communicates with the interior tank chamber 12 and is operable to vent the urea chamber through to prevent pressure buildup therein. An optional handle 20 is also shown, mounted to the tank 10.

The tank 10 defines an opening 30 communicating between the exterior and interior of the tank through an upper surface of the tank. A closure member is provided that is adapted for mounting to the tank (e.g. friction fit, interference fit, using interfitting elements, or otherwise) so as to close the tank opening 30. One form of closure member is indicated by the number 40 in FIG. 1. Closure member 40 comprises a closure member body or header 42. This particular closure member also comprises a locking ring 44, such as described below in connection with FIG. 3, for detachably securing or mounting the closure member to the tank.

As will be more apparent from the discussion of FIG. 1A below, a urea inlet passageway 60 passes through the valve body and communicates with the interior 12 of tank 10. Inlet passageway 60 is coupled to a urea return line 64. The line 64 is coupled to a vehicle exhaust treatment system 66 so as to provide a return path for urea from the exhaust treatment system back to the urea storage tank. A urea outlet passageway 68 also communicates through the closure member body 42 from the exterior to the interior of the tank 10. Outlet passageway 68 is coupled to a urea supply line 70 through which urea is delivered from the interior of the storage tank to the exhaust treatment system for application in doses to the exhaust being treated. In one specific example, urea in line 70 is pumped from the tank by a urea pump which can comprise a portion of the exhaust system. The urea pump may be heated, such as by coolant recirculating therethrough from the engine coolant system. From the pump, the urea is applied to a urea dosing unit and injected into a urea treatment region of the exhaust system through which exhaust gases pass. In the case of a diesel engine, the exhaust treatment system can comprise one or more diesel particulate filters upstream of the urea treatment region and one or more catalytic converters downstream of the urea treatment region.

In FIG. 1, a diesel engine is indicated at 72 for powering a truck or other diesel powered vehicle 74. Engine 72 has an engine coolant system 76 through which coolant is recirculated to carry heat away from the engine. Thus, the coolant is warmed by the engine during its operation and can be used to, for example, heat urea within the urea storage tank. In the embodiment of FIG. 1, a coolant inlet passageway 82 communicates through the closure member body 42 from the exterior of the tank to the interior of the tank. In addition, a coolant outlet passageway 80 is also provided and communicates through the closure member body 42 from the interior to the exterior of the tank. A coolant recirculation or heating conduit 86 is positioned within the tank interior 12 and comprises a portion of a recirculation loop from passageway 82, through the loop 36 and back to the passageway 80. Coolant from passageway 82 passes through a downwardly extending conduit section 88, through the heater conduit section 86 and back through an upwardly extending conduit 90 to the passageway 80. A coolant inlet to passageway 82 is coupled via line 94 to a source of coolant from the engine coolant system. A coolant outlet of passageway 80 is coupled via line 96 to a coolant return pathway in the engine coolant system.

One or both of the inlet and outlet coolant passageways is desirably provided with a valve to selectively close the valved passageway or passageways to thereby selectively block the flow of coolant through the heating conduit in the tank. In the embodiment of FIG. 1, the valve is indicated at 100 in a position to selectively block the flow of coolant in the coolant inlet passageway 82. The valve 100 comprises a valve body 102 mounted to the closure member body 42. At least a portion of the valve body 102 can be of one piece integral construction with the closure member body 42. As a specific example, the closure member body and such portion of the valve body can be molded of a polymer material.

In FIG. 1, the heater conduit 86 is coupled to a support 110, which can be of rubber or other compressible material, which can be compressed to allow downward movement of the closure member into a position to lock the closure member to the tank. The mount 110 can detachably engage and mate with a pin or projection at the base of the tank to maintain the conduit 86 at a desired location within the tank. A support, such as a down tube 120, is desirably coupled to the closure member and extends downwardly therefrom. A temperature sensor 126 can be placed, for example, within the downtube at the lower end therein for sensing the temperature of the urea at this location. Electrical conductors or wires 128, 130 can be coupled to a connector carried by the closure member body with the connector being electrically connected by electrical conductors within the downtube to the temperature sensor 126. A level sensor can also be provided for detecting the level of urea within the tank 14. Although other forms of level sensors or detectors can be used, one form of a level sensor comprises a float 134 that is annular in form and is operable to slide upwardly and downwardly along the downtube 120 as the urea level rises and/or falls. The float 134 can be coupled (e.g. magnetically coupled to operate reed switches) to level sensing circuitry positioned within the downtube 120 to thereby provide a signal indicating the level of urea within the tank. Electrical conductors of the level sensing circuit can terminate in a connector carried by the closure member body 42. Electrical conductors such as wires 140, 142 are coupled to this connector for transmission of the level indicating signals. A common connector with plural pins carried by the closure member can be used for coupling to the temperature and level signal carrying wires 128, 130, 140 and 142. The valve 100 can be a solenoid operated valve. A connector can be carried by closure member body 42 for coupling to electrical conductors or wires used in providing control signals for operating the solenoid controlled valve. In FIG. 1, a first wire or conductor 150 is coupled through a switch 154 to one pin of the valve operating connector. Conductor 150 can be coupled to a positive voltage source. A conductor 152, which can be connected to ground of the voltage source, is connected to another pin of the valve connector. In response to control signals on line 156, the switch 154 is closed to power the solenoid controlling the valve 100 to shift the valve to block coolant from flowing through the valve and into the recirculation loop in the tank. The control signals can be responsive to the temperature of the urea, such as to block the flow of coolant when the urea temperature exceeds a threshold in the case of a normally open valve. The valve 100 is open in this example in the absence of power to the valve operating solenoid. The various signals can be transmitted on a conventional communications bus provided in many trucks.

Figure 1A:
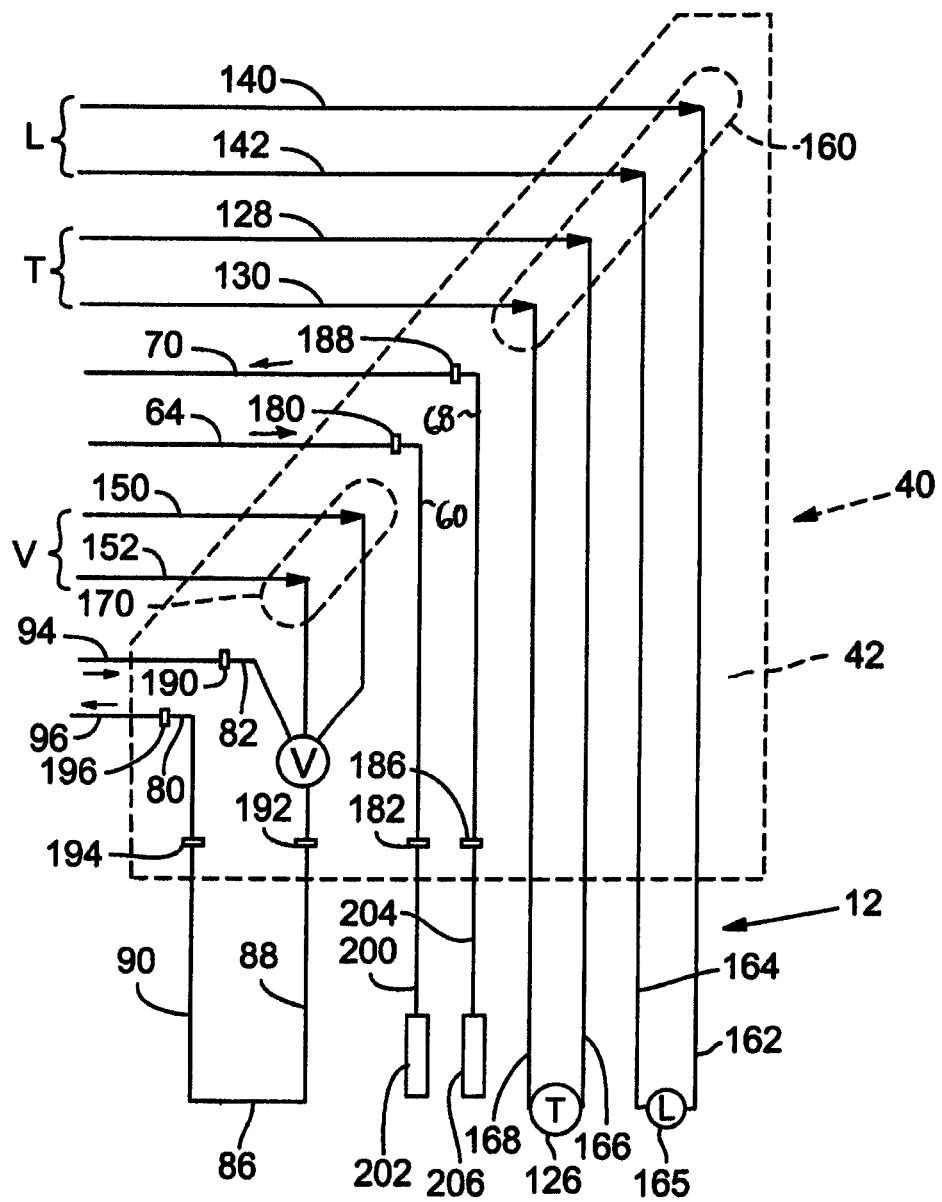
FIG. 1A is a schematic diagram showing coolant inlet and outlet passageways and urea inlet and outlet passageways through the closure member body.

In FIG. 1A, for convenience, the numbers used in this figure for components thereof are the same as the numbers used in FIG. 1 for corresponding components. In FIG. 1A, a connector 160 carried by the closure member body is illustrated for connecting respective wires 140, 142 of the level sensing circuit to respective wires 162, 164 forming part of the level sensing circuit 165 within the downtube 120. In addition, connector 160 connects wires 128, 130 of the temperature sensor circuit to corresponding wires 166, 168 of a portion of the temperature sensing circuit within the downtube. A connector 170, carried by the closure member body 42, is also shown in FIG. 1A for connecting the wires 150, 152 of the valve control circuit to pins of the connector that are electrically connected to the solenoid used to control the valve 100. The urea inlet passageway 60 is illustrated schematically in FIG. 1A and has a urea inlet 180 and a urea outlet 182 with the passageway 60 communicating between the inlet 180 and outlet 182. The urea outlet passageway 68 is also illustrated as having an inlet 186 and outlet 188 with the passageway 68 communicating from the inlet 186 to the outlet 180. The coolant inlet passageway 82 is also shown in FIG. 1A with an inlet 190 and an outlet 192 with passageway 82 communicating from the inlet 190 to the outlet 192. In addition, the coolant outlet passageway 80 is shown in FIG. 1A with an inlet 194 and an outlet 196 and with the passageway 80 communicating from the inlet 194 to the outlet 196. Urea passageway 60 is coupled to the urea return conduit 200 extending to a lower region of the tank interior. Conduit 200 can have a urea filter 202 coupled thereto for filtering urea as it is returned to the tank. In addition, urea supply passageway 68 can be coupled to a downwardly extending conduit 204 that also extends to a lower region of the tank interior. A filter 206 can be coupled to conduit 204 for filtering urea delivered from the tank to the conduit 204. Other arrangements of these conduits can be utilized.

Figure 2:
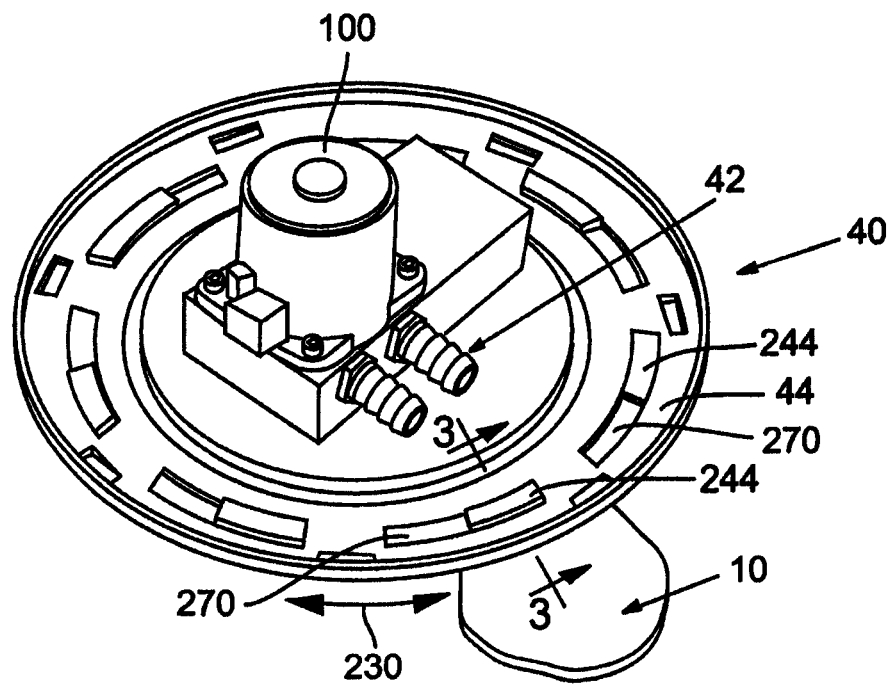
FIG. 2 is a top perspective view of an upper portion of an embodiment of a closure member.
Figure 3:
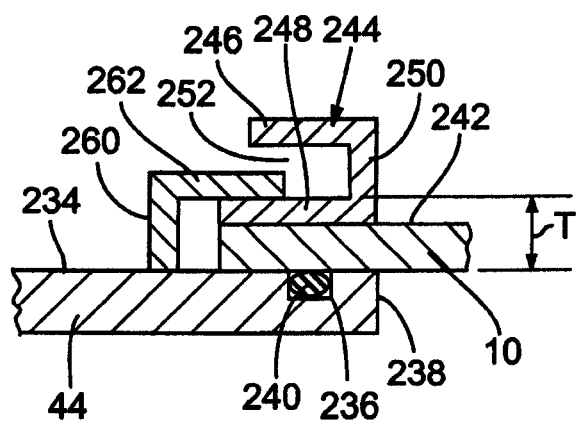
FIG. 3 is a vertical sectional view of a portion of a locking mechanism in one form suitable for use in closure member embodiments, in this case taken along line 3-3 of FIG. 2.

As previously mentioned, the closure member is desirably detachably mounted to the tank. Although various approaches such as mentioned above can be used for coupling the closure member to the tank, in one specific example, shown in FIGS. 2 and 3, an SAE standard locking ring can be utilized. In FIG. 2 and FIG. 3, the closure member of this embodiment is shown rotated to its maximum extent in the direction of arrow 230 to a locking position. The exemplary closure member comprises a locking ring portion 44. An upper surface 234 (FIG. 3) of the ring 44 has an annular groove 236 recessed into the ring 44 adjacent to the perimeter 238 of the ring. An o-ring gasket 240 is positioned in groove 236 and, when in a position shown in FIG. 3, is compressed to form a seal between tank 10 and the closure member 30. Channel defining arcuate segments 244, which are generally C shaped with upper and lower legs 246, interconnected by a vertical base 250 to define a channel 252 therebetween, are mounted at spaced locations to an upper surface 242 of the tank 10. Two of these segments are numbered as 244 in FIG. 2. The channels 252 face radially inwardly in this example. A plurality of supports 260, each carrying a respective radially outwardly extending flange 262, are coupled to the upper surface 234 of the ring 44. When the closure member is locked in place, flange 262 is positioned at least partially within the channel 252. The thickness T (between the flange engaging upper surface of leg 248 and the under surface of the tank wall of tank 10 immediately beneath leg 248) increases as the ring is rotated in the direction of arrow 230, causing the gasket 240 to be compressed and also compressing the support 110 (FIGS. 1 and 4) to assist in applying a biasing force to hold the ring 44 and closure member 40 in a locked position. In contrast, rotation of the ring 44 in the direction opposite to arrow 230 decreases the thickness T and shifts the ring relative to locking segments 244 to position the locking segments in alignment with respective openings 270 through the ring. The openings 270 are sized to permit the ring, and thus the closure member, to be lifted free of the locking segments 244 and thereby the tank 10.

Figure 4:
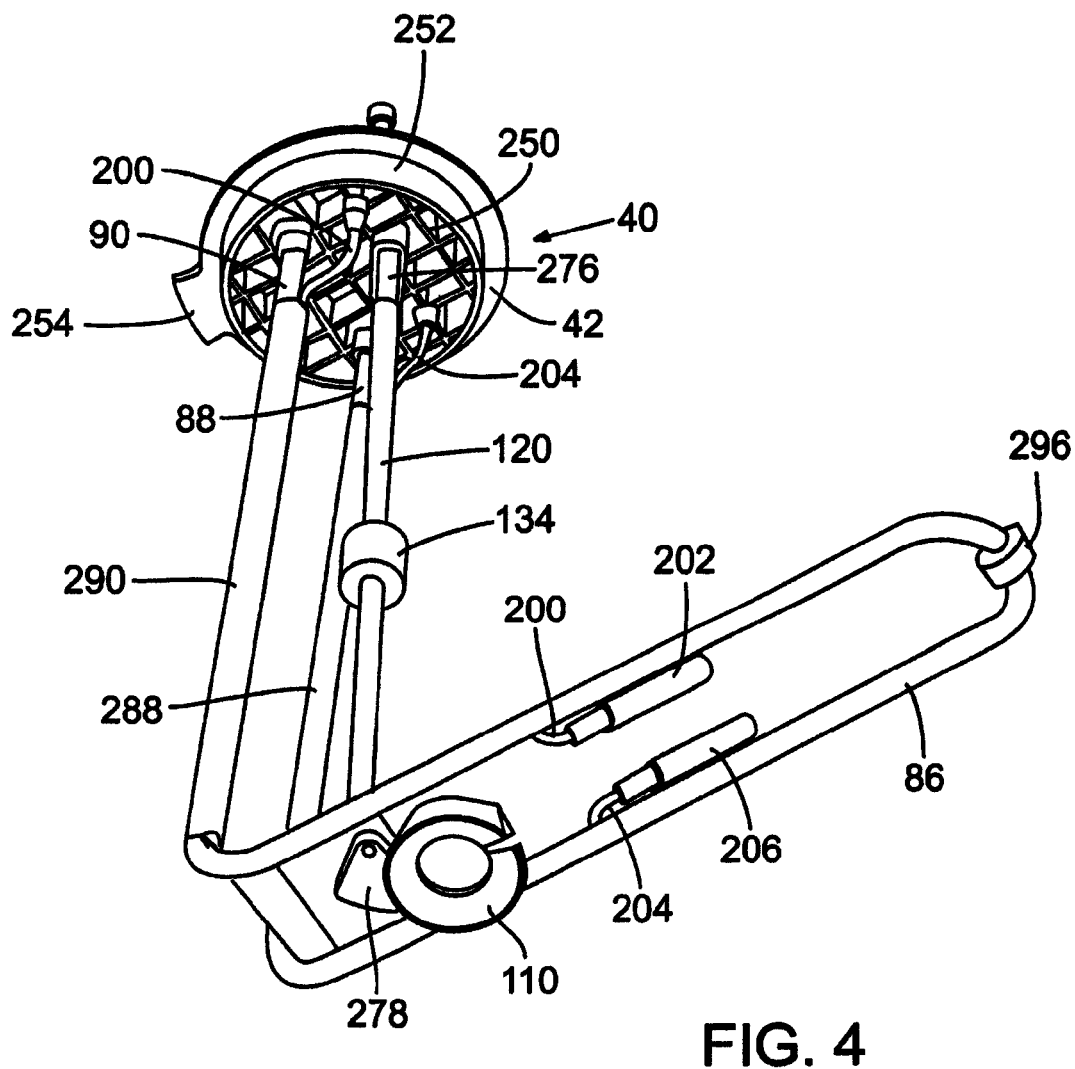
FIG. 4 is a bottom perspective view of an embodiment of a closure member in accordance with the disclosure.
Figures 5, 6:
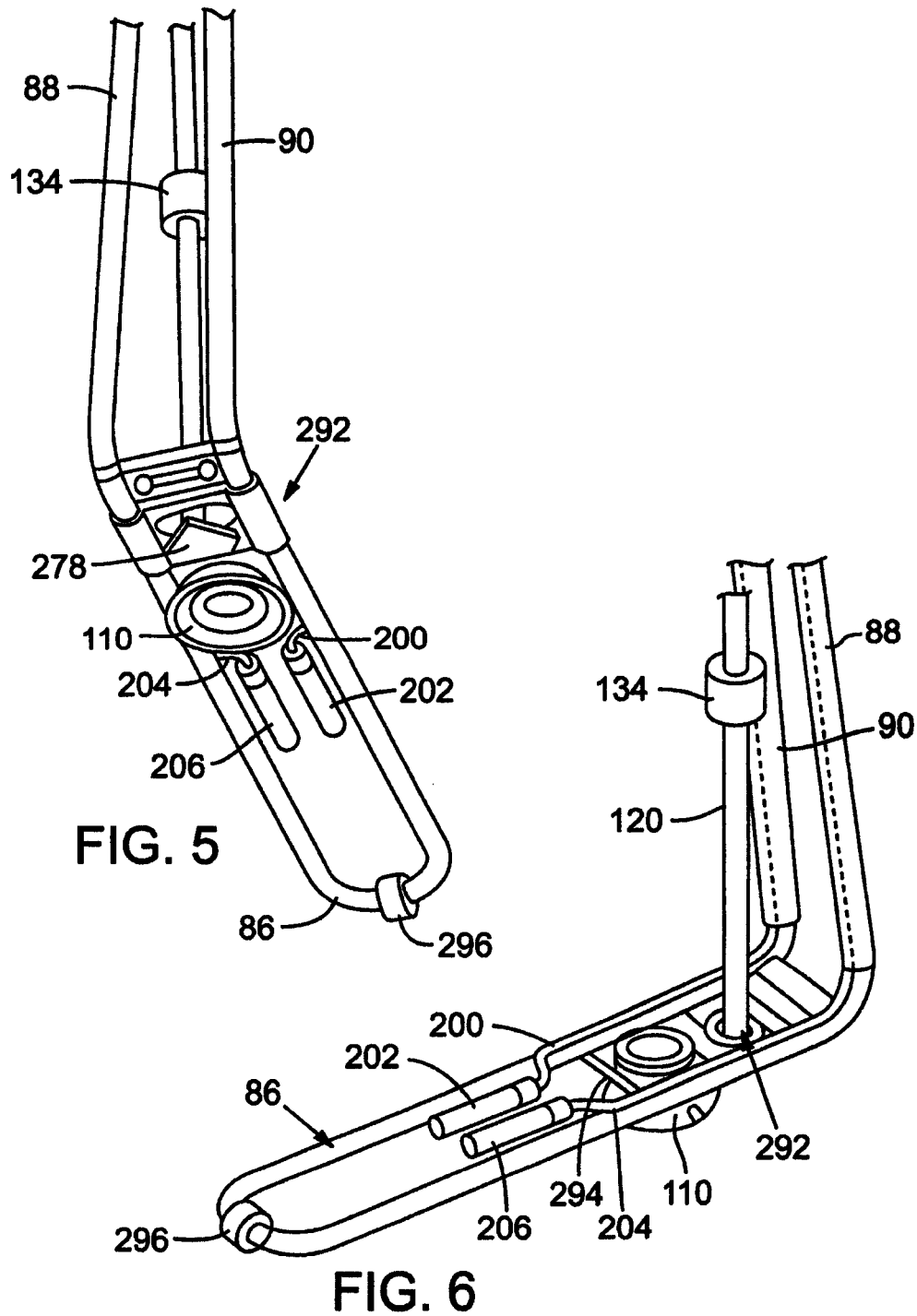
FIGS. 5 and 6 are respective perspective views of a lower portion of the embodiment of FIG. 4.

With reference to FIGS. 4-6, an alternative embodiment of a closure member 40 comprises a closure member body 42 having reinforcing ribs 250 at the underside of the closure member body. The ribs 250 are surrounded by a peripheral annular projecting rim member 252. A tab or flange 254 is provided as a part of the closure member body 42. The tab 254 can be grasped for use in rotation of the closure member to free the closure member from engagement with the tank. In FIGS. 4-6, elements corresponding to similar elements shown in FIG. 1 have been assigned the same numbers as in FIG. 1 and will not be discussed in detail. With reference to FIG. 4, an annular coupler 276 is used to couple the downtube 120 to the closure member. The lower end of coupler 276 comprises a stop that limits the extent to which the float 134 can travel upwardly. A plug 278 is shown at the lower end of downtube 120 (see FIGS. 4 and 5). Coupler 276 and plug 278 seal the interior of the downtube 120 against the inflow of urea or other fluid. Crimping sleeves or tubes 288, 290 can be used for insulation purposes and also to hold urea conduits 202, 204 in position against the respective coolant lines 90, 88. A first bracket 292 (FIGS. 5 and 6) can be used to couple a lower end of the downtube 120 to the conduits 88, 90, to establish the spacing of these conduits 90, 88, and to rigidify the structure. A second bracket 294 can be provided to support the tank engaging cushion 110. A spacer, such as an annular rubber ring 296, can be used to establish spacing between the lower surface of the interior of the tank and the heating loop 86.

Figure 7:
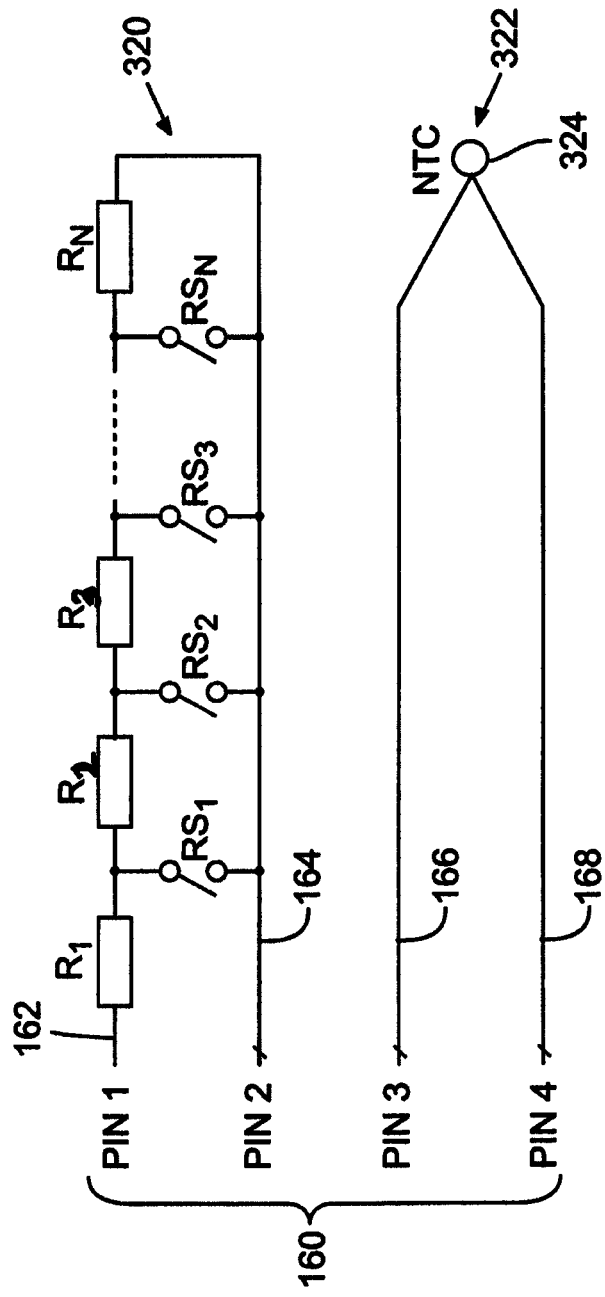
FIG. 7 is a schematic illustration of an exemplary level sensor circuit and temperature sensor circuit that can be included in the closure member.

FIG. 7 illustrates an exemplary level sensing circuit 320 and temperature sensing circuit 322. An exemplary temperature sensing circuit 322 comprises an NTC thermistor 324. Other forms of temperature sensors can be utilized. Wires 166, 168 couple the thermistor 324 to pins of a connector 160. The illustrated thermistor, for example, can have a resistance R=1 k ohm at 25 degrees C. (plus or minus 5%). The beta value of the thermistor can, for example, be 3528 k (plus or minus 0.5%). The exemplary level sensing circuit 320 comprises a plurality of reed switches $RS_1, RS_2, RS_3, \ldots RS_x$, each switch being connected so as to provide a path from wire 162 to wire 164 when the switch is closed. A plurality of resistors is provided in line 162 with resistor $R_0$ being provided between pin 1 and switch $RS_1$, resistor $R_1$ being provided between switch $RS_1$ and switch $RS_2$, resistor $R_2$ being provided between switch $RS_2$ and switch $RS_3$, ..., and resistor $R_x$ being provided between the switch $RS_x$ and line 164. Thus, a resistive ladder is provided. As float 134 rises or falls, the float causes the switch adjacent to the float to close with the resistance in the circuit controlling the current through the level circuit 320 to thereby indicate the level of fluid in the tank. In a specific example, a level sensor can be established to vary the resistance by 5% with every 20 mm change in height of urea from a minimum height of 54 mm to a maximum height of 446 mm.

Figure 8:
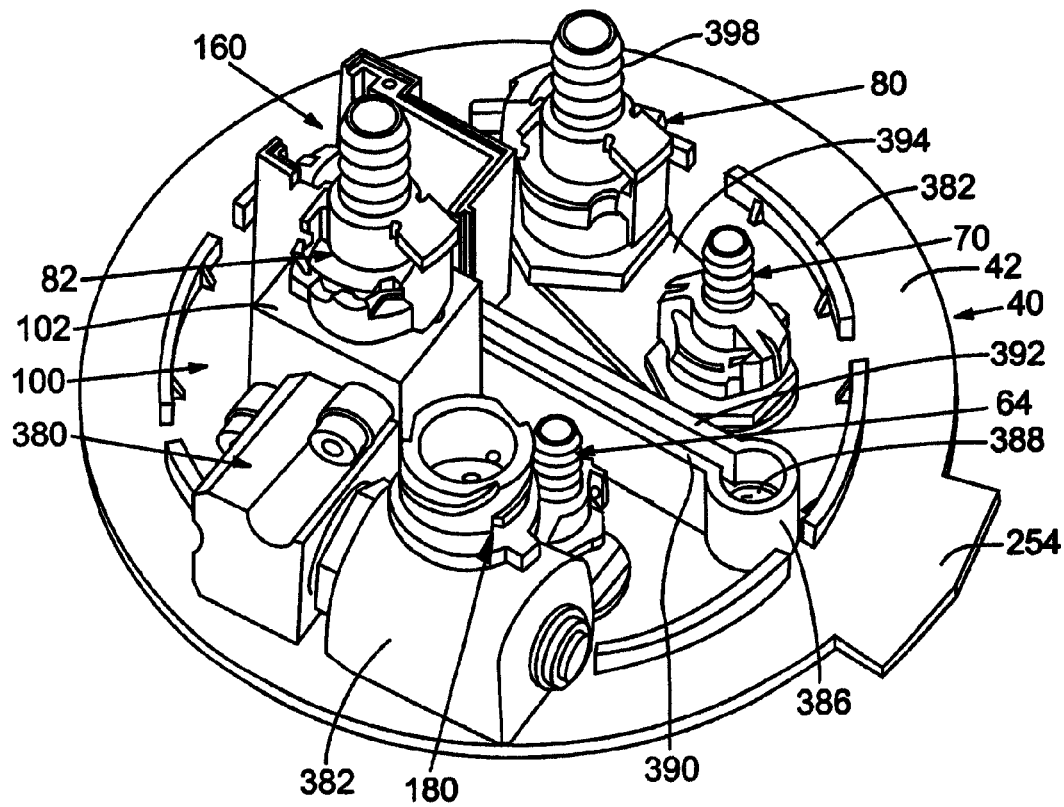
FIG. 8 is a top perspective view of yet another embodiment of a closure member, with lower portions of the closure member not being shown in this Figure and with closure member to urea tank connection features being omitted in this example.
Figure 10:
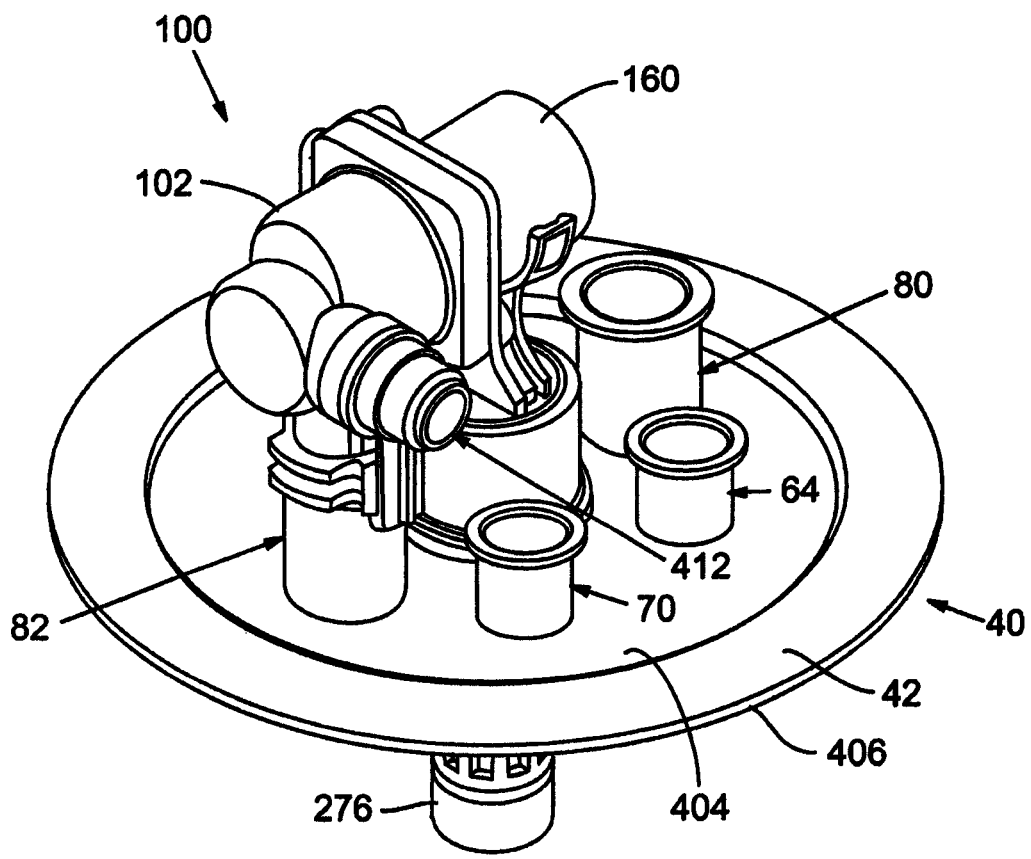
FIG. 10 is a perspective view, looking down from above, to another alternative form of closure member with lower portions of the closure member omitted and with closure member to tank coupling features also omitted.

FIGS. 8 and 10 illustrate alternative embodiments of a closure member 40 having a closure member body 42. In FIGS. 8 and 10, elements corresponding to elements shown in FIG. 1 and FIG. 1A have been assigned the same numbers as used in FIGS. 1 and 1A for convenience.

Figure 9:
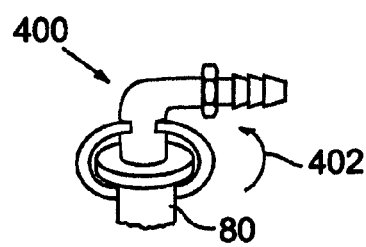
FIG. 9 is a side elevational view of an exemplary 90 degree coupler that can be used at the urea inlet and outlet, and at the coolant inlet and outlet, of the closure member.

In the embodiment of FIG. 8, the valve 100 is operated by a valve driver 380 controlled by a solenoid 382. Upwardly projecting arcuate flange segments, one being numbered as 382 in FIG. 8, can be provided to receive a cap to cover the assembly with the elements 382 providing, for example, an interference or friction fit with the cap. In addition, a generally annular projection 386 extends upwardly from the upper surface of closure member body 42. Projection 386 defines a location for a vent opening 388 through the closure member which can be used for a vent (not shown) incorporated into or mounted to the closure member as an alternative to the vent 18 shown in FIG. 1. Opening 388 is normally plugged in the absence of the vent. Upwardly projecting walls 390, 392 define a slot therebetween which intersects the opening 388. The slot can accommodate portions of the vent if included in the closure member. Also, reinforcements, such as a planar metal plate 394, can be mounted to the closure member, to reinforce the connections at the locations of the various inlets and outlets from the closure member. Using heat conductive material for the reinforcements 394, with the reinforcements extending between either or both of the coolant inlet or coolant outlet and the urea inlet or urea outlet, provides heat transfer paths for warming the urea. Commercially available upwardly projecting conduit receiving connectors are shown mounted to the closure member in communication with the respective urea and coolant inlets and outlets. As an alternative, all or some of these connectors (one being numbered as 398 in FIG. 8) can be replaced with commercially available 90 degree rotatable connectors, such as indicated at 400 in FIG. 9. The use of rotatable connectors provides added flexibility to the closure member in that conduits can be routed to and from these connectors in many alternative directions simply by rotating the connector, such as indicated by arrow 402.

In the embodiment of FIG. 10, as one example, the closure member body 42 can comprise a disc of stainless steel or other metal that is stamped to provide a recess 404 that is circular in shape at a location interiorly of the periphery 406 of the closure member body 42. Tank interlocking features are not shown in this closure member. In the embodiment of FIG. 10, coolant fluid enters via an inlet 412 and passes through a valve controlled opening within the valve body 102 to the coolant fluid inlet 82 passageway of the closure member. A coolant outlet passageway is shown at 80 in FIG. 10. Respective urea inlet and outlet passageways are indicated by the numbers 64 and 70 respectively.

Having illustrated and described the principles of our invention with reference to a number of exemplary embodiments, it should be apparent to those of ordinary skill in the art that these embodiments may be modified in arrangement and detail without departing from the inventive principles disclosed herein. We claim as our invention all such embodiments that fall within the scope of the following claims.

We claim:

1. A urea tank assembly for a urea delivery system for delivering urea to and receiving urea from an exhaust treatment system of a vehicle, the vehicle comprising an engine coolant system, the urea tank assembly comprising:

a urea tank body defining an interior urea storage chamber;

the tank body comprising a tank opening at an upper portion of the tank body;

a tank closure member detachably mounted to the tank body so as to cover the tank opening, the tank closure member comprising a closure member body, the closure member body comprising a urea inlet communicating with the urea storage chamber and for coupling to the exhaust treatment system of the vehicle for use in returning urea from the exhaust treatment system to the urea storage chamber, a urea outlet communicating with the urea storage chamber and for coupling to the vehicle exhaust treatment system for use in delivering urea from the urea storage chamber to the exhaust treatment system, a coolant inlet for coupling to the vehicle coolant system and a coolant inlet passageway communicating from the coolant inlet through the closure member body, a coolant outlet for coupling to the vehicle coolant system and a coolant outlet passageway communicating from the coolant outlet through the closure member body, a heating conduit positioned within the interior urea storage chamber and communicating from the coolant inlet passageway to the coolant outlet passageway, the closure member body also comprising a valve body and valve within the valve body that is operable to selectively open and close at least one of the coolant inlet passageway and the coolant outlet passageway so as to selectively permit the flow of coolant from the vehicle coolant system, through the coolant inlet, through the coolant passageway, through the heating conduit, through the coolant outlet passageway, through the coolant outlet and back to the vehicle coolant system.

2. An apparatus according to claim 1 further comprising a support carried by the closure member body and extending into the interior urea chamber, a urea temperature sensor carried by the support and a urea level sensor carried by the support.

3. An apparatus according to claim 2 wherein the closure member body supports an electrical connector for coupling electrical conductors to the temperature sensor and to the level sensor.

4. The assembly of claim 2, wherein the urea level sensor comprises a float that is operable to move upwardly and downwardly as the urea level rises and fall within the tank.

5. An apparatus according to claim 1 wherein the valve comprises a solenoid controlled valve and wherein the closure member body supports an electrical connector for coupling electrical power to the solenoid controlled valve.

6. An apparatus according to claim 1 wherein the closure member body is molded of a polymer material.

7. An apparatus according to claim 1 wherein at least a portion of the valve body is a one piece integral portion of the closure member.

8. An apparatus according to claim 1 wherein the closure member comprises ninety-degree bend rotatable conduit couplings, a respective one of such couplings being mounted to each of the coolant inlet, the coolant outlet, the urea inlet and the urea outlet.

9. The assembly of claim 1, wherein the tank closure further comprises an annular locking ring positioned around the closure member body and mechanically interlockable with the tank to secure the tank closure to the tank.

10. A closure member for closing a tank opening communicating with the interior of a urea storage tank, the urea storage tank being for use in a urea delivery system for delivering urea to and receiving urea from an exhaust treatment system of a vehicle, the vehicle comprising an engine coolant system, the closure member comprising:
a closure member body adapted for detachable mounting to the tank so as to cover the tank opening;
the closure member body comprising a urea inlet communicating with the interior of the urea storage tank and for coupling to the exhaust treatment system of the vehicle for use in returning urea to the interior of the urea storage tank from the exhaust treatment system, a urea outlet communicating with the interior of the urea storage tank and for coupling to the vehicle exhaust treatment system for use in delivering urea from the interior of the urea storage tank to the exhaust treatment system, a coolant inlet for coupling to the vehicle coolant system and a coolant inlet passageway communicating from the coolant inlet through the closure member body, a coolant outlet for coupling to the vehicle coolant system and a coolant outlet passageway communicating from the coolant outlet through the closure member body, a heating conduit positioned within the interior urea storage chamber and communicating from the coolant inlet passageway to the coolant outlet passageway, the closure member body also comprising a valve body and valve within the valve body that is operable to selectively open and close at least one of the coolant inlet passageway and the coolant outlet passageway so as to selectively permit the flow of coolant from the vehicle coolant system, through the coolant inlet, through the coolant passageway, through the heating conduit, through the coolant outlet passageway, through the coolant outlet and back to the vehicle coolant system.

11. An apparatus according to claim 10 further comprising a support carried by the closure member body and extending into the interior urea chamber, a urea temperature sensor carried by the support and a urea level sensor carried by the support.

12. An apparatus according to claim 11 comprising an electrical connector for coupling electrical conductors to the temperature sensor and to the level sensor.

13. An apparatus according to claim 10 wherein the valve comprises a solenoid controlled valve and a first electrical connector carried by the closure member body for coupling electrical power to the solenoid controlled valve.

14. An apparatus according to claim 10 wherein the closure member body is molded of a polymer material.

15. An apparatus according to claim 10 wherein at least a portion of the valve body is a one piece integral portion of the closure member.

16. An apparatus according to claim 10 wherein the closure member comprises ninety-degree bend rotatable conduit couplings, a respective one of such couplings being mounted to each of the coolant inlet, the coolant outlet, the urea inlet and the urea outlet.

17. A closure member for closing a tank opening communicating with the interior of a urea storage tank, the urea storage tank being for use in a urea delivery system for delivering urea to and receiving urea from an exhaust treatment system of a vehicle, the vehicle comprising an engine coolant system, the closure member comprising:
a closure member body adapted for detachable mounting to the tank so as to cover the tank opening;
the closure member body comprising a urea inlet communicating with the interior of the urea storage tank and for coupling to the exhaust treatment system of the vehicle for use in returning urea to the interior of the urea storage tank from the exhaust treatment system, a urea outlet communicating with the interior of the urea storage tank and for coupling to the vehicle exhaust treatment system for use in delivering urea from the interior of the urea storage tank to the exhaust treatment system, a coolant inlet for coupling to the vehicle coolant system and a coolant inlet passageway communicating from the coolant inlet through the closure member body, a coolant outlet for coupling to the vehicle coolant system and a coolant outlet passageway communicating from the coolant outlet through the closure member body, a heating conduit positioned within the interior urea storage chamber and communicating from the coolant inlet passageway to the coolant outlet passageway, the closure member body also comprising a valve body and valve within the valve body that is operable to selectively open and close at least one of the coolant inlet passageway and the coolant outlet passageway so as to selectively permit the flow of coolant from the vehicle coolant system, through the coolant inlet, through the coolant passageway, through the heating conduit, through the coolant outlet passageway, through the coolant outlet and back to the vehicle coolant system;
a support carried by the closure member body and extending into the interior urea chamber, a urea temperature sensor carried by the support and a urea level sensor carried by the support;
the valve comprising a solenoid controlled valve and wherein the closure member body carries a first electrical connector for coupling electrical power to the solenoid controlled valve; and
a second electrical connector coupled to the closure member body for coupling electrical conductors to the temperature sensor and to the level sensor.

18. An apparatus according to claim 17 wherein the closure member comprises ninety-degree bend rotatable conduit couplings, a respective one of such couplings being mounted to each of the coolant inlet, the coolant outlet, the urea inlet and the urea outlet.

19. An apparatus according to claim 17 wherein at least a portion of the valve body is a one piece integral portion of the closure member.

\* \* \* \* \*